US008866336B2

(12) United States Patent
Campbell

(10) Patent No.: US 8,866,336 B2
(45) Date of Patent: Oct. 21, 2014

(54) BATHING SYSTEM LOAD DEVICE WITH AUXILIARY POWER CONNECTION

(75) Inventor: Graham J. Campbell, Stevenson Ranch, CA (US)

(73) Assignee: Balboa Water Group, Inc., Tustin, CA (US)

( * ) Notice: Subject to any disclaimer, the term of this patent is extended or adjusted under 35 U.S.C. 154(b) by 848 days.

(21) Appl. No.: 13/007,915

(22) Filed: Jan. 17, 2011

(65) Prior Publication Data

US 2012/0181867 A1 Jul. 19, 2012

(51) Int. Cl.

| | |
|---|---|
| ***H02B 1/24*** | (2006.01) |
| *A61H 33/00* | (2006.01) |
| *A61H 33/14* | (2006.01) |
| *A61H 33/02* | (2006.01) |

(52) U.S. Cl.

CPC ............ *A61H 33/60* (2013.01); *A61H 33/0087* (2013.01); *A61H 2201/0207* (2013.01); *A61H 2033/0083* (2013.01); *A61H 2201/0228* (2013.01); *A61H 2033/141* (2013.01); *A61H 2033/0079* (2013.01); *A61H 33/02* (2013.01)

USPC ................ 307/38; 15/319; 15/327.5; 15/339; 307/129; 439/535; 439/357; 439/41; 4/541.5; 4/541.1; 392/308; 392/441; 219/481; 219/497; 165/43; 237/2 B; 340/618

(58) Field of Classification Search

CPC ....... A61H 33/60; A61H 33/00; A61H 33/02; A61H 33/005

USPC .................. 15/319, 327.5, 339; 307/129, 38; 27/456; 439/535; 451/357, 41; 417/411, 410.1

See application file for complete search history.

(56) References Cited

U.S. PATENT DOCUMENTS

| | | | | |
|---|---|---|---|---|
| 5,079,784 | A * | 1/1992 | Rist et al. | 4/541.2 |
| 5,361,215 | A * | 11/1994 | Tompkins et al. | 700/300 |
| 5,747,973 | A * | 5/1998 | Robitaille et al. | 323/239 |
| 2002/0125772 | A1* | 9/2002 | Kemp | 307/140 |

* cited by examiner

*Primary Examiner* — Jared Fureman
*Assistant Examiner* — Elim Ortiz
(74) *Attorney, Agent, or Firm* — Larry K. Roberts

(57) ABSTRACT

A line voltage device with an auxiliary power connection for a bathing installation. An exemplary embodiment of the device includes a housing structure, and a primary electrical power connection connected to the housing structure and including a primary wiring cable for connection to a line voltage source. A load system is disposed within or adjacent the housing and configured for powered operation by electrical power from the primary electrical power connection. An auxiliary power connection is provided for electrical connection to a separate bathing installation device to provide power to the separate device. A wiring circuit is disposed within or adjacent the housing structure and electrically couples the primary electrical power connection and the auxiliary power connection so that line voltage power is shared between the load system and the separate bathing installation device.

20 Claims, 7 Drawing Sheets

BATHING SYSTEM LOAD DEVICE WITH AUXILIARY POWER CONNECTION

BACKGROUND

Bathing installations, such as spas and whirlpool baths, typically include several electrical devices or systems, powered by line voltage. Connecting these devices to pre-installed power outlets can present problems, since the existing outlets may not be closely located relative to the devices, and may be limited in number.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
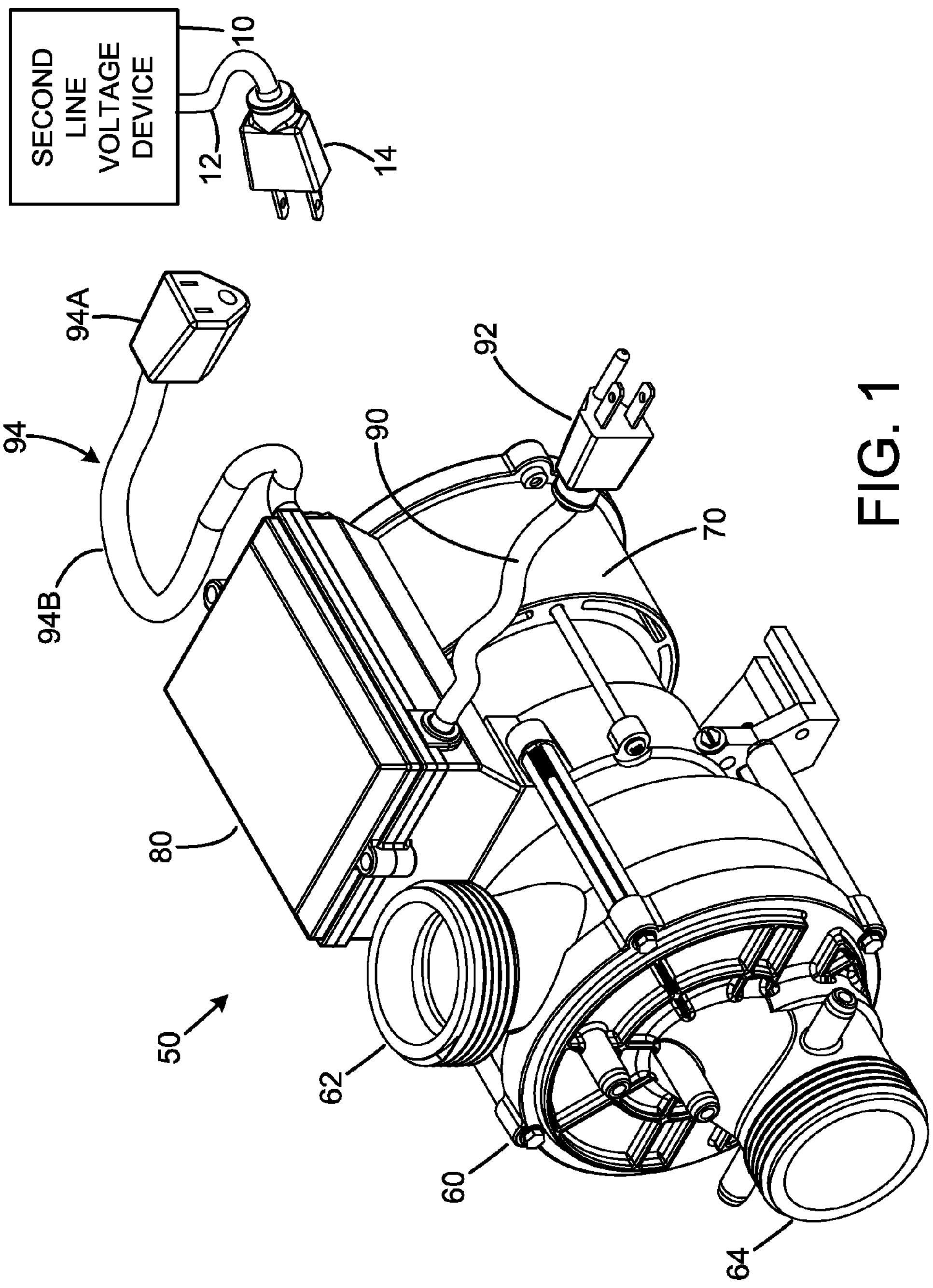
FIG. 1 is an isometric view of an exemplary embodiment of a bathing installation water pump with an auxiliary power connection.

In the following detailed description and in the several figures of the drawing, like elements are identified with like reference numerals. The figures are not to scale, and relative feature sizes may be exaggerated for illustrative purposes.

Figure 2A:
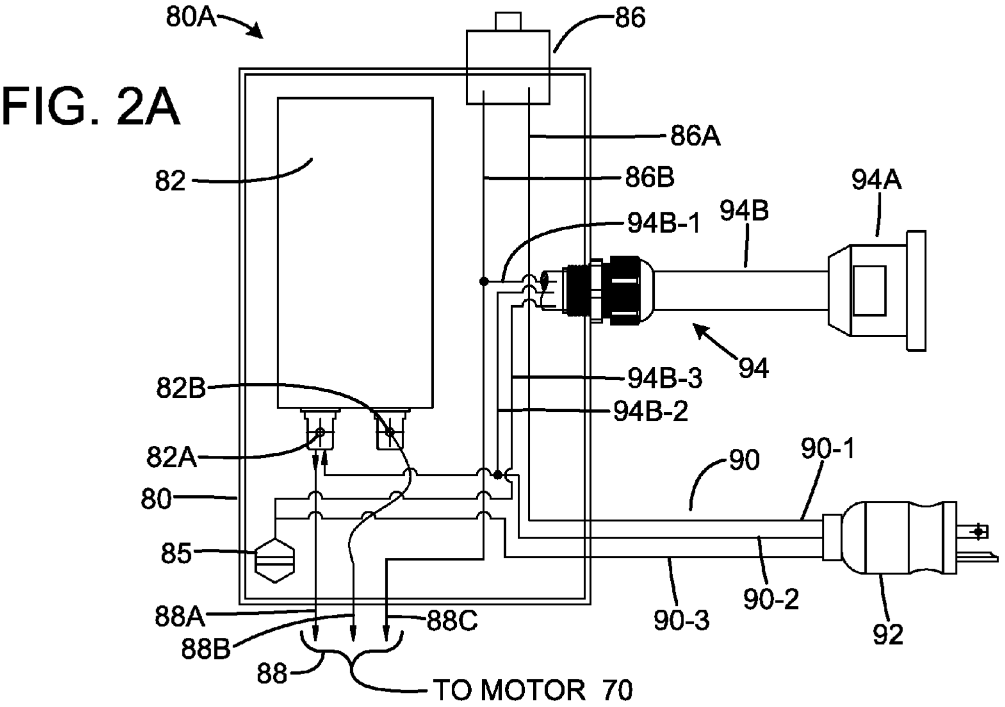
FIG. 2A is an exemplary schematic wiring diagram illustrating one exemplary power connection configuration for the pump of FIG. 1A.
Figure 2B:
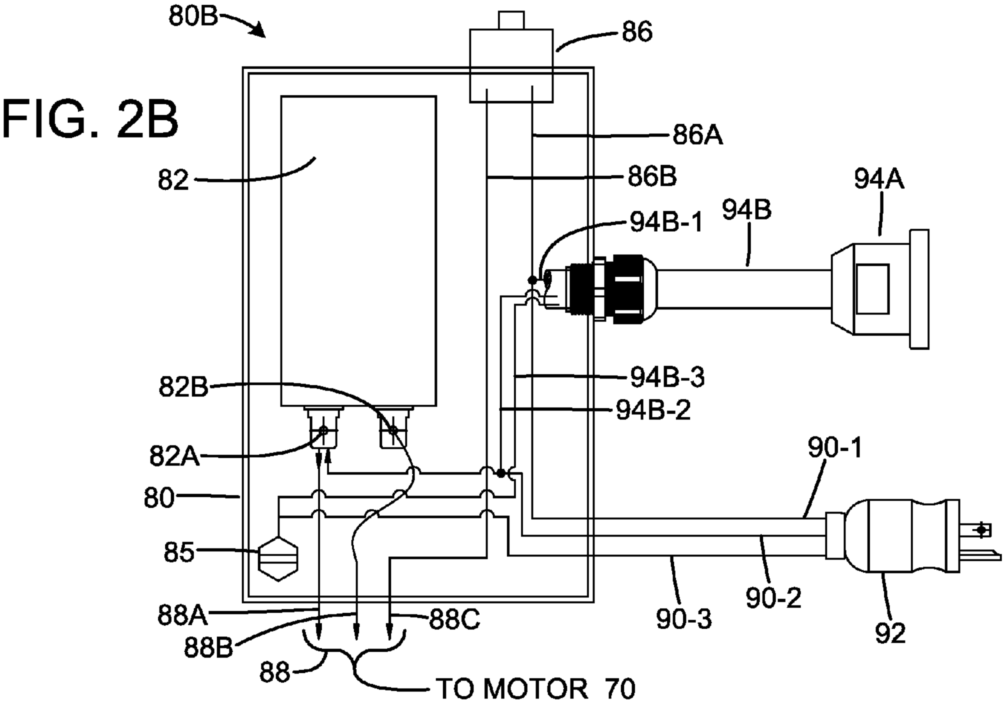
FIG. 2B is an exemplary schematic wiring diagram illustrating another exemplary power connection configuration for the pump of FIG. 1A.
Figure 2C:
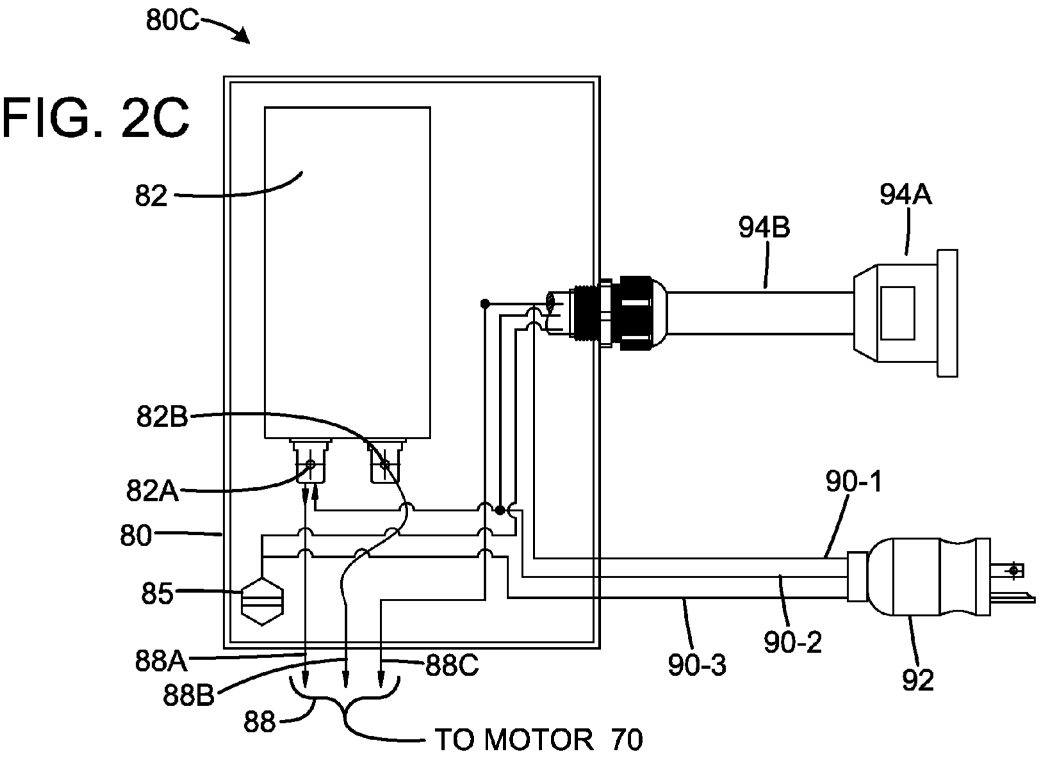
FIG. 2C is an exemplary schematic illustrating another exemplary power connection configuration for the pump of FIG. 1A.

FIGS. 1-2C illustrate an exemplary embodiment of a bathing system load device equipped with an auxiliary line voltage outlet or connector, to allow the load device to power another line voltage device or load. This exemplary load device 50 is a water pump system, including a pump 60 with a water inlet port 64 and a water outlet port 62, integrated or assembled to an electric motor 70. The motor shaft (not shown in FIG. 1) is coupled to an impeller (not shown in FIG. 1) of the pump to drive the pump to pump water entering the inlet port from a conduit through the pump and out the outlet port to an outlet conduit forming a part of the water flow path of the bathing installation. Electrical power to the motor is provided by wiring 90 and connector plug 92, which is configured for connection to a line voltage outlet adjacent the bathing installation. For some application, the connector plug 92 is omitted, and the distal end of the wiring 90 hardwired directly to a line voltage source, e.g. at a wall junction box. To the extent just described, the pump system 50 is conventional.

In accordance with an aspect of the invention, the pump system 50 is provided with an auxiliary line voltage power outlet 94, powered from electrical power received from the power source through the primary power wiring 90 and connector plug 92. In this exemplary embodiment, the auxiliary power connection 94 is configured as a "pigtail" connector with wiring 94B and connector 94A. In this embodiment, the auxiliary power connector may be used to electrically power a second line voltage device 10, through wiring 12 and connector 14 configured to mate with auxiliary power connector 94A. For example, an ozone generator or bathing installation lighting may be connected to the auxiliary power connection 94. The total electrical load presented to the line voltage power outlet should not exceed the rated load for the power outlet. If the power outlet is rated at 15 A, then the total current draw by both the pump 50 and the second device 10 should not exceed 15 A.

The pump system 50 includes an electrical module or junction box 80 in which is mounted the electrical wiring circuitry for providing electrical power to the motor and connecting the auxiliary outlet to the voltage at the power inlet to the motor. There are several alternatives to the state of the auxiliary power outlet 94. The auxiliary power outlet can be wired to be "live" or connected to power when the pump is turned on, e.g. by switching the power outlet to which the primary electrical connector 92 is connected. Another alternative is for the circuitry to provide that the auxiliary power outlet is live at all times power is live and connected to the pump primary power connector 92, even when the pump is turned off by a separate switch. A further alternative is for the auxiliary outlet to be live only when the pump is turned on, i.e. so that the auxiliary outlet is turned on and off with the pump motor.

Figure 1A:
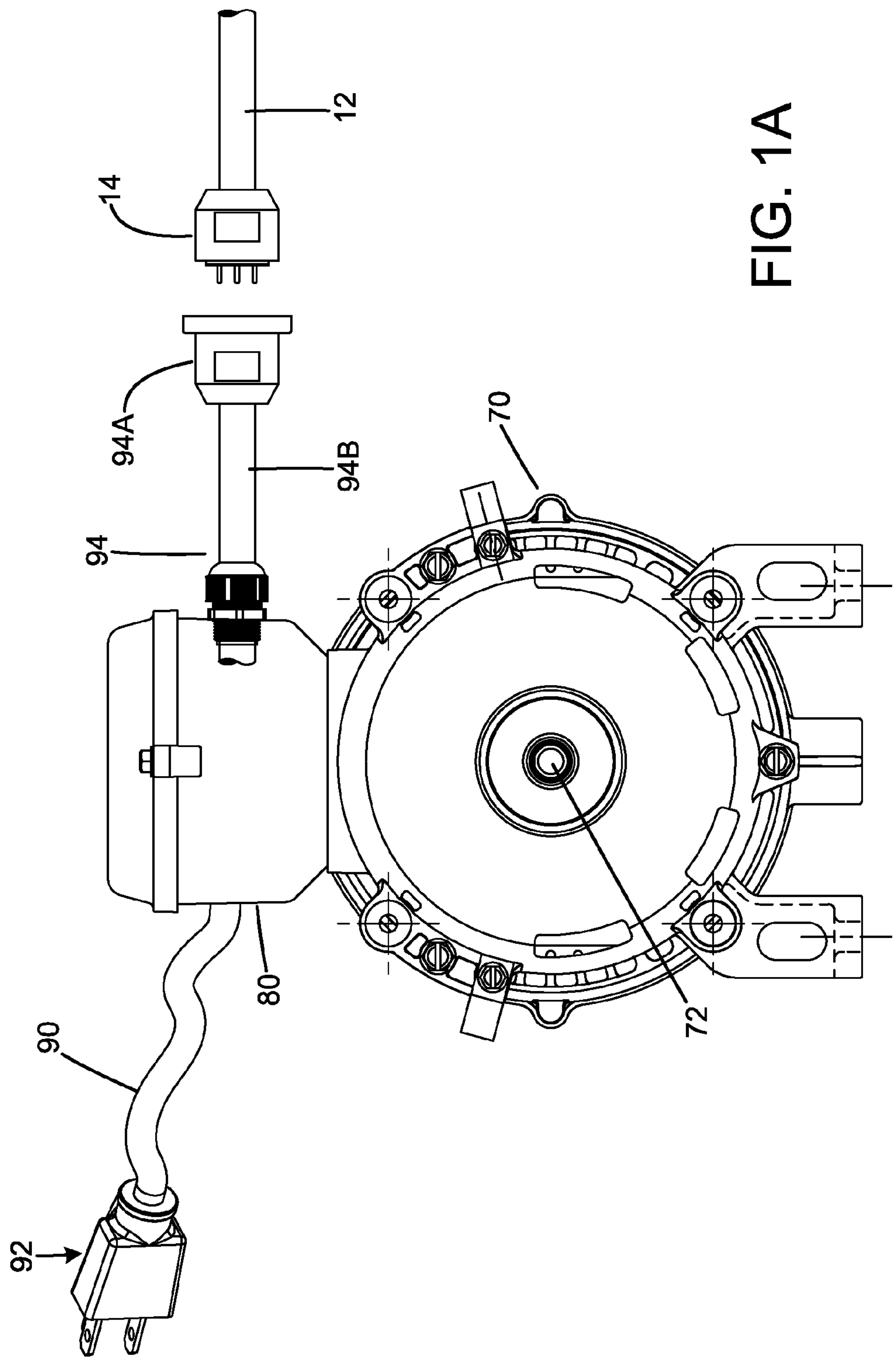
FIG. 1A is a front view of an exemplary bathing installation pump with an auxiliary power connection.

FIG. 1A is a front view of an exemplary embodiment of the motor 70 of the pump system 50 of FIG. 1, with the pump 60 removed. The motor shaft 72 is visible in FIG. 1A. FIG. 1A shows the electrical module box 80, the primary power connection comprising the wiring 90 and connector 92, for connection to the line voltage connector, and the auxiliary power connection 94, with the wiring 94B and connector 94A. The connector 14 and wiring 12 for the second line voltage system 10 is also visible in FIG. 1A.

FIGS. 2A-2C illustrate several exemplary, alternate wiring circuit configurations for connecting the auxiliary power connection to the primary power connection. The wiring configurations are implemented by wiring within the module box 80 in this example. It will be seen that, in these examples, each wiring circuit in box 80 includes a capacitor 82 with terminals 82A and 82B. The use of capacitors in bathing installation pump motor drive circuits is well known, and the box 80 is commonly referred to as the capacitor box.

FIG. 2A illustrates a wiring circuit configuration 80A in which the power connection to the pump motor 70 and to the auxiliary power connection 94 is controlled by an air switch receiver 86. Thus, the motor and the auxiliary power connection are switched together, so that power is applied to the auxiliary connection whenever power is applied to the motor 70. The switch receiver 86 is switched by a remote air switch actuator, typically located on a bathing installation panel adjacent the bathing tub and connected to the switch receiver by an air tubing (not shown). Suitable air switches are commonly commercially available, e.g., the series TBS air switch marketed by Teckmark Coroporation, 7745 Metric Drive, Mentor, Ohio 44060, described at www.tecmarkcorp.com/products/air-switches-tbs.php. Other air switches are available. In this case, the switch receiver includes two wire or terminal connections, 86A and 86B. Depending on the state of the switch receiver, continuity will either exist between 86A and 86B, or be interrupted, in which case 86B is open circuited relative to 86A.

In the exemplary embodiment shown in FIG. 2A, the primary power connection is a grounded, three-wire connection, with wire 90-1 a "hot" wire, wire 90-2 a "common" wire, and wire 90-3 a ground wire to be connected to the pump ground 85. Wire 90-1 is connected to switch wire 86A, and common wire 90-2 is connected to capacitor terminal 82A. The second switch wire 86B is provided as one output component of the motor drive signals 88 to be connected to the motor windings. Wires 88A and 88B are connected to the capacitor terminals 82A and 82B, respectively, and form the second and third output components of the motor drive signals. The capacitor 82 is used to assist in starting the motor 60. The motor 70 will be operated only when the switch receiver 86 provides continuity between its terminal wires 86A and 86B, connecting the "hot" lead from the power source to the motor drive.

Still referring to FIG. 2A, the auxiliary power connection is also a three-wire power connection, with wire 94B-1 a "hot" lead or wire, wire 94B-2 a common lead or wire, and wire 94B-3 a ground wire connected to the ground 85. The hot lead 94B-1 is connected to switch wire 86B. The common lead 94B-2 is connected to the capacitor terminal 82A. Thus, the hot lead 94B-1 of the auxiliary power connection will be live or hot only when the switch wire 86B is live or hot, and so the auxiliary power connection is switched on/off with the motor drive signals.

FIG. 2C illustrates an alternate circuit configuration 80C, in which the motor drive signals 88 are hot or energized at all times the primary power connection 90 and 92 is hot or active. This might be the case, for example, for an application in which the line voltage source outlet to which connector 92 is connected is a switched outlet, or to a bathing installation control box or spa pack for power connection through a relay or triac switch, for example. In this configuration, there is no air switch, and the hot leads of the primary and auxiliary power connections are connected together, with the motor drive hot component 88C live or turned off, depending on the state of the power applied to the primary power connection. As with the circuit configuration of FIG. 2A, the common leads of both the primary and auxiliary power connections are connected to terminal 82A of the capacitor 82. The components 88A and 88B of the motor drive signals 88 are the same as described above for the circuit configuration 80A of FIG. 2A.

Another exemplary alternate circuit configuration 80B is shown in FIG. 2B. In this wiring configuration, the pump motor 80 is controlled by an air switch receiver 86, to be either turned on or off depending on the switch state. Hot lead 90-1 of the primary power connection is connected to the lead 86A of the switch, and switch wire 86B is connected as the hot or live lead 88C of the motor drive signals 88. The common and ground connections of the primary and auxiliary power connections are as described above regarding the circuit configurations 80A and 80B. However, the hot lead 94B-1 of the auxiliary power connection is connected to the hot lead 90-1 of the primary power connection, and so the auxiliary power connection will be "hot" or active whenever the primary power connection is active or hot.

Figure 1B:
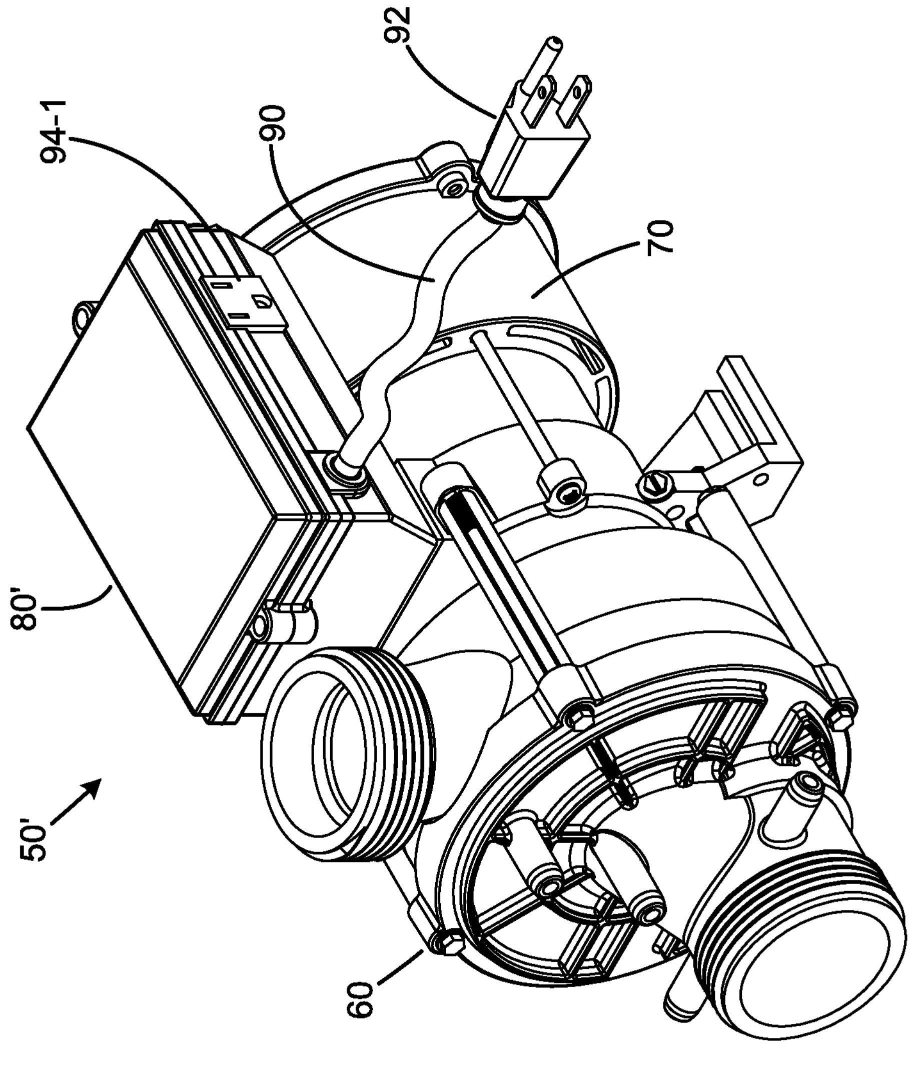
FIG. 1B is an isometric view of an alternate embodiment of a bathing installation water pump with an auxiliary power connection.

The auxiliary power connection can be a "pigtail" connection of a wiring cable and connector or plug attached to a distal end of the wiring cable. This power connection can include a mechanically secure connector at the sidewall of the module box 80, e.g. one which meets UL requirements with strain relief. Alternatively, the auxiliary power connection can include a female outlet plug mounted directly in a sidewall of the box 80, as illustrated in FIG. 1B, for example. The pump system 50' (FIG. 1B) is identical to system 50, except that the wiring cable 94B and female connector 94A have been replaced with a female outlet plug 94-1 in a sidewall of the module box 80'. The terminals of the plug 94-1 are connected to the wiring inside the box 80' in the same manner as described above with respect to the wires of the cable 94B.

Figure 3:
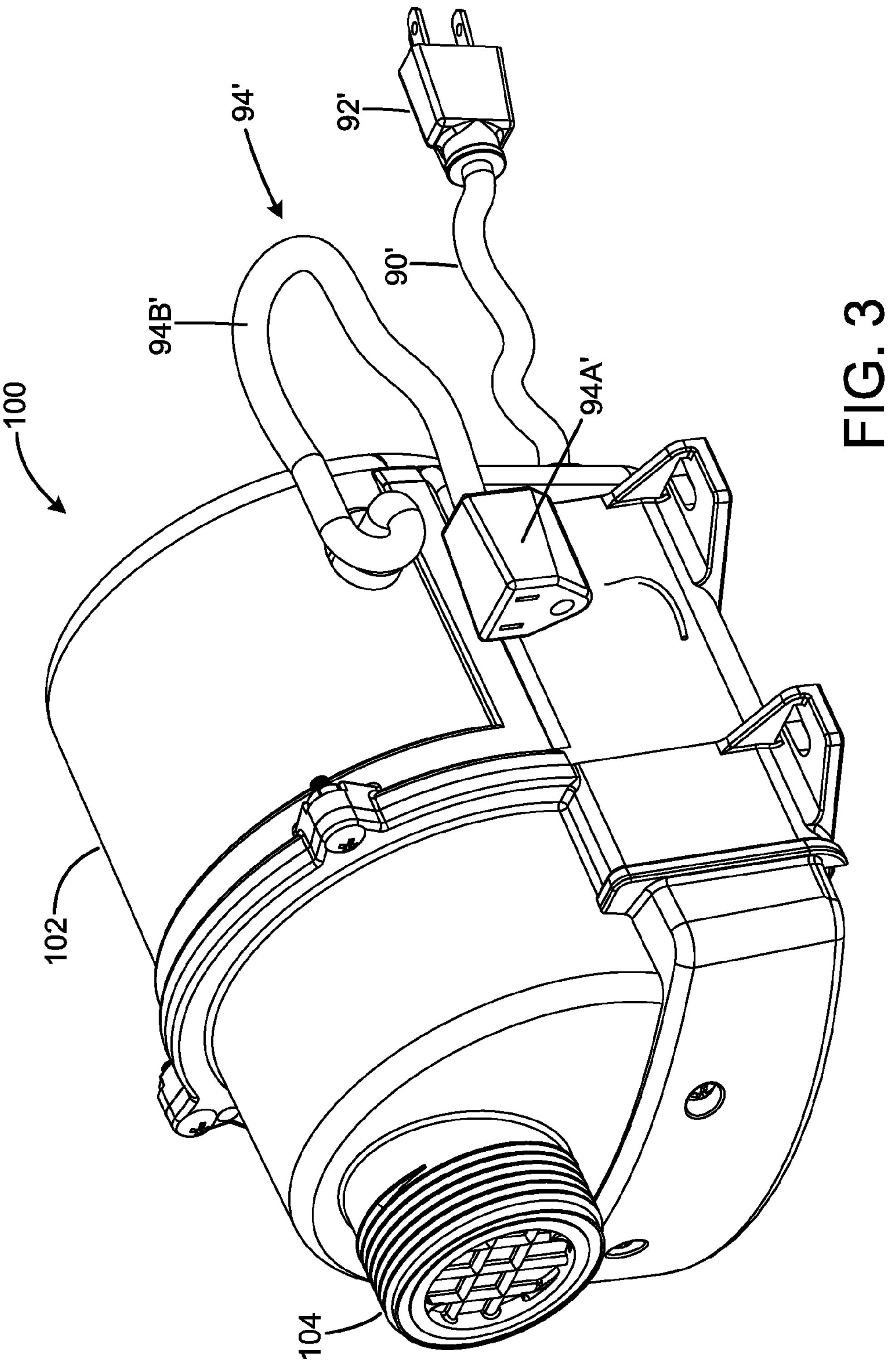
FIG. 3 is an isometric view illustrating an exemplary embodiment of an air blower for a bathing installation, with an auxiliary power connection.

The embodiments of FIGS. 1-2C have described a line voltage load device which is a motor-driven water pump for a bathing installation. In other embodiments, the line voltage load device may take other forms. For example, the line voltage load device may be an air blower 100 as illustrated in FIG. 3. In this case, the air blower has an outlet port 104 defined in housing 102, with the port for connection to an air delivery conduit system of a bathing installation. The air blower output may be connected to a set of jets, for example, in a bathing installation such as a spa or whirlpool bath. An exemplary air blower is described for example in pending U.S. application Ser. No. 11/961,888, the entire contents of which are incorporated herein.

In accordance with an aspect of this invention, the air blower 100 may include an auxiliary power connection 94' for connection to another device powered by line voltage. The air blower includes a primary power connection with power cord 90' and plug 94' configured in this exemplary embodiment for connection to a line voltage power outlet adjacent the bathing installation, to drive the blower electric motor. The air blower also includes the auxiliary power connection 94' with auxiliary cord 94B' and connector plug 94A' which is connected by a wiring circuit configuration analogous to that described above regarding FIGS. 2A-2C for the pump application, except that the wiring circuit will typically not include a capacitor for assisting in motor start-up. The auxiliary power connection can be switched on/off by an air switch with the operation of the blower, connected to line voltage when the blower motor is active on, or connected to line voltage independent of the switched condition of the blower motor drive. The circuitry for connection between the primary and auxiliary power connections can be disposed within the housing 102 of the blower, or in a utility box attached to the housing.

Figure 4A:
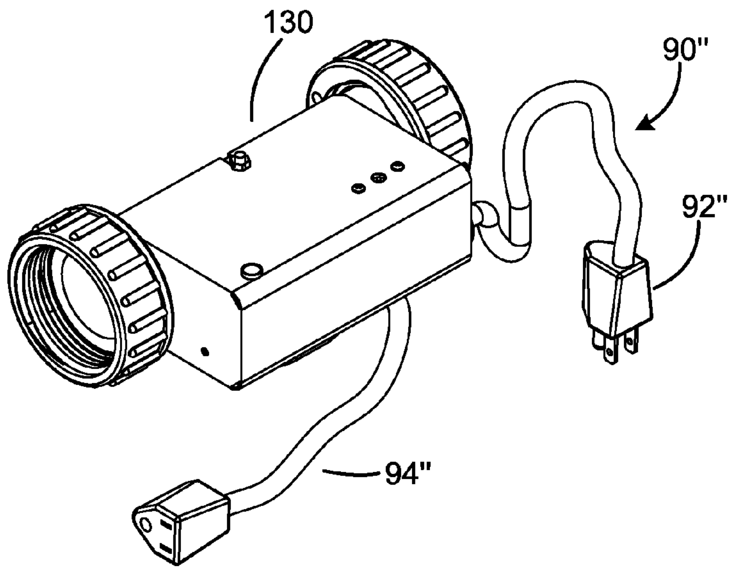
FIGS. 4A and 4B are respective isometric views of different exemplary embodiments of water heaters for bathing installation, each with an auxiliary power connection.
Figure 4B:
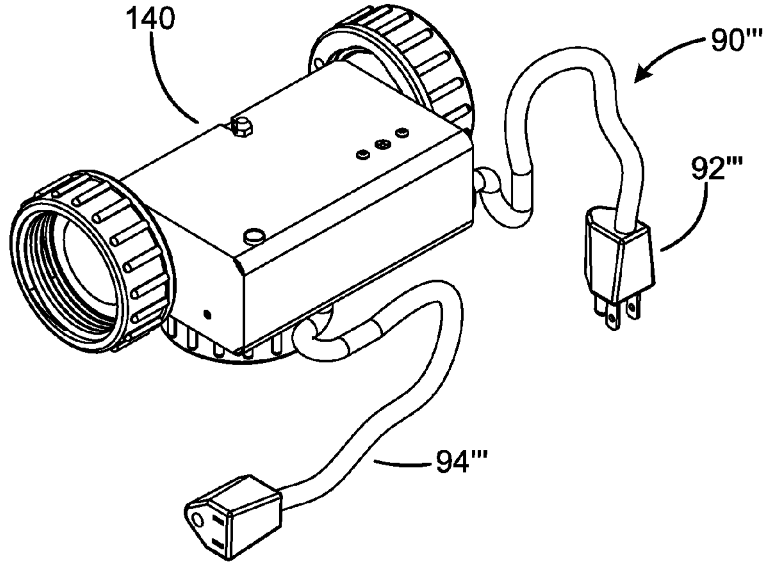

The line voltage load source may also be a water heater, connected in a water flow recirculating water flow line of a bathing installation. FIGS. 4A-4B illustrate two exemplary embodiments of a water heater with an auxiliary power connection. Each embodiment includes an electrically powered heater element, e.g. a resistive heater element. The heater element is powered by a primary line voltage power connection. The heater 130 of FIG. 4A is an in-line two port heater, with a primary line voltage power connection comprising wiring 90" and connector plug 92". The heater 130 includes an auxiliary line voltage power connection 94". The wiring configuration between the primary power connection and the auxiliary power connection is typically installed within the heater housing, and can take various forms. For example, the wiring configuration can be adapted so that the auxiliary power connection is switched on/off by a bathing installation pressure/vacuum switch, or by the heater electronic controller so that the auxiliary power connection is energized when the heater resistive element is energized. The primary power connection may take the form of a direct wiring connection to a terminal block on the bathing installation controller board in some cases. Exemplary devices which may be connected to the auxiliary power connection include an ozone generator or bathing installation lighting. FIG. 4B illustrates an exemplary embodiment of a three port water heater system 140, which includes a primary line voltage power connection including wiring 90''' and connection 92''', for connection to the line voltage source. The heater system 140 also includes an auxiliary power connection 94".

Although the foregoing has been a description and illustration of specific embodiments of the subject matter, various modifications and changes thereto can be made by persons skilled in the art without departing from the scope and spirit of the invention.

What is claimed is:

1. A line voltage load device for a bathing installation, comprising:

a housing structure;

a primary electrical power connection connected to the housing structure or to an electrical box attached to the housing structure, and including a primary wiring cable having at least first and second wires and a distal end for connection to a line voltage supply source;

a line voltage load system disposed within the housing structure and configured for powered operation by electrical power from the primary electrical power connection, the load system having first and second terminals for connection to the first and second wires of the primary electrical power connection;

an auxiliary power connection attached to the housing structure or the electrical box, and including an auxiliary outlet connector for electrical connection to a separate bathing installation line voltage device to provide power to the separate device;

a wiring circuit within the housing structure or the electrical box, and electrically coupling the primary electrical power connection and the auxiliary power connection so that power from the line voltage source is shared between the load system and the separate bathing installation device; and a single, manually operated switch device mounted in the housing structure or the electrical box and having an open circuit position and a closed position in which electrical continuity exists through the switch, the switch device connected in series between the first terminal of the load system and the primary electrical power connection and configured for directly interrupting line voltage from the primary wiring cable to the load system in response to actuation of the switch device; and wherein, when the primary electrical connection distal end is connected to the line voltage supply source, the line voltage load system is connected to line voltage at all times, unless the switch device is in the open circuit position.

2. The device of claim 1, wherein the single, manually operated switch device includes an air switch receiver, the device further comprising a remote air switch actuator connected to the air switch receiver by an air tubing.

3. The device of claim 1, wherein the wiring circuit connects the auxiliary power connection to the primary power connection such that the auxiliary power connection is energized whenever the primary power connection is energized, and the auxiliary power connection is interrupted from line voltage whenever the switch device interrupts line voltage from the primary wiring cable to the load system.

4. The device of claim 1, wherein the wiring circuit is configured such that the auxiliary power connection is energized whenever the primary power connection is energized and independent of operation of the single, manually operated switch member.

5. The device of claim 1, wherein the device is an electrical water pump, and the load member is an electric motor.

6. The device of claim 1, wherein the device is an air blower, and the load device is an electric motor.

7. The device of claim 1, wherein the device is a heater, and the load device is a resistive heater element.

8. The device of claim 1, wherein the auxiliary power connection includes a length of wiring having a first end attached to the wiring circuit within the housing, and a second end electrically connected to the auxiliary power connector.

9. The device of claim 1, wherein the auxiliary outlet connector is mounted to the housing.

10. A line voltage device for a bathing installation, comprising:

a housing structure;

a primary electrical power connection connected to the housing structure or to an electrical box attached to the housing structure, and including a primary wiring cable for connection to a line voltage source, the cable including at least a first wire and a second wire;

a line voltage load system disposed within or adjacent the housing and configured for powered operation by electrical power from the primary electrical power connection;

an auxiliary power connection mounted to the housing structure or to the electrical box, and configured to provide an electrical connection to a separate line voltage bathing installation device to provide power from the line voltage source to the separate device;

a wiring circuit within or adjacent the housing structure and electrically coupling the primary electrical power connection and the auxiliary power connection so that power from the line voltage source is shared between the load system and the separate bathing installation device;

a single, manually operated switch device mounted in the housing structure or the electrical box and having an open circuit position and a closed position in which electrical continuity exists through the switch, the switch device connected in series between the first wire and the load system, the switch device configured for directly interrupting line voltage from the primary wiring cable to the load system in response to actuation of the switch device; and wherein, when the primary electrical connection distal end is connected to the line voltage supply source, the line voltage load system is connected to line voltage at all times, unless the switch device is in the open circuit position.

11. The device of claim 10, wherein the single, manually operated switch device and the wiring circuit are configured to selectively interrupt line voltage from the primary wiring cable to the auxiliary power connection at all times the power to the line voltage load system is interrupted, and for applying line voltage to the auxiliary connection at all times line voltage is applied to the line voltage load system.

12. The device of claim 11, wherein the switch device includes an air switch receiver.

13. The device of claim 10, wherein the wiring circuit is configured to connect the auxiliary power connection to the primary power connection so that the auxiliary power connection is energized whenever the primary power connection is energized, independent of operation of the single, manually operated switch device.

14. The device of claim 10, wherein the device is an electrical water pump, and the load member is an electric motor.

15. The device of claim 14, wherein the housing includes an electrical module box attached to an electric motor casing, and the wiring circuit is disposed within the electrical module box.

16. The device of claim 10, wherein the device is an air blower, and the load device is an electric motor.

17. The device of claim 10, wherein the device is a heater, and the load device is a resistive heater element.

18. The device of claim 10, wherein the auxiliary power connection includes a length of wiring having a first end attached to the wiring circuit within the housing, and a second end electrically connected to an auxiliary power connector.

19. The device of claim 10, wherein the auxiliary power connection includes an auxiliary outlet connector mounted to the housing.

20. The device of claim 10, wherein the primary power connection includes a primary connector electrically connected to a distal end of the primary wiring cable.

* * * * *